United States Patent [19]
Arimochi et al.

[11] Patent Number: 4,912,295
[45] Date of Patent: Mar. 27, 1990

[54] BUTT WELDING METHOD

[75] Inventors: Kazushige Arimochi, Nishinomiya; Kazumi Isaka, Amagasaki; Takao Taka, Ikoma, all of Japan

[73] Assignee: Sumitomo Metal Industries, Ltd., Osaka, Japan

[21] Appl. No.: 203,156

[22] Filed: Jun. 7, 1988

[30] Foreign Application Priority Data

Aug. 27, 1987 [JP] Japan ................................. 62-213823
Aug. 27, 1987 [JP] Japan ................................. 62-213824

[51] Int. Cl.$^4$ ............................................. B23K 11/02
[52] U.S. Cl. .................................... 219/104; 219/9.5; 219/102; 219/121.64
[58] Field of Search ................ 219/101, 102, 104, 64, 219/9.5, 121.64

[56] References Cited

U.S. PATENT DOCUMENTS

| | | | |
|---|---|---|---|
| 1,586,690 | 6/1926 | Murray, Jr. | 219/104 |
| 2,919,342 | 12/1959 | Kohler et al. | 219/104 |
| 3,192,355 | 6/1965 | Foster | 219/104 |
| 3,366,768 | 1/1968 | Osborn, Jr. | 219/102 |
| 3,619,548 | 11/1971 | Cavagnero | 219/104 |
| 4,044,219 | 8/1977 | Lebedev et al. | 219/104 |
| 4,713,519 | 12/1987 | Bersch et al. | 219/64 |

Primary Examiner—Clifford C. Shaw
Attorney, Agent, or Firm—Burns, Doane, Swecker & Mathis

[57] ABSTRACT

A butt welding method is disclosed, which comprises abutting a pair of steel sheets and welding the abutting surfaces by opposing electrodes while preventing gaps from developing between the widthwise outer portions of said steel sheets by suppressing rotational deformation of the abutting surfaces in the widthwise outer portions thereof.

20 Claims, 9 Drawing Sheets

BUTT WELDING METHOD

BACKGROUND OF THE INVENTION

This invention relates to a butt welding method for joining steel sheets to one another.

In recent years, butt welding has come to be widely used in place of flash butt welding as a method of efficiently and accurately joining steel sheets with one another.

Figure 1A:
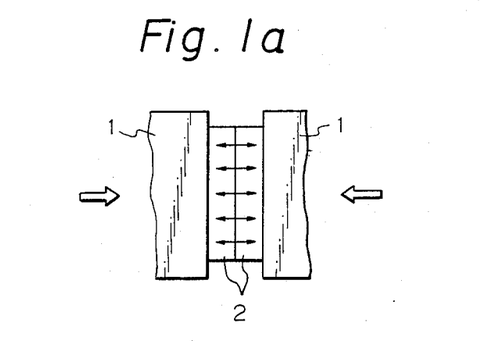
FIG. 1a is a schematic view illustrating a butt welding method.
Figure 1B:
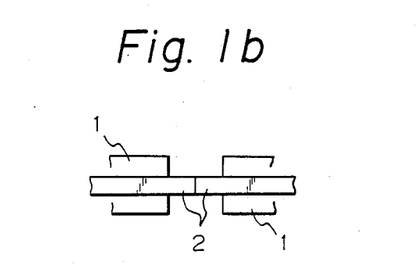

Butt welding is a type of resistance pressure welding method. In this method, as shown in FIGS. 1a and 1b, two steel sheets 2 to be welded are held between two confronting electrodes 1 which also serve as a means for applying pressure. The ends of the steel sheets 2 are made to abut under pressure and a large current is passed therebetween, as a result of which the end surfaces of the steel sheets 2 are joined to one another in an extremely short time.

Figure 2:
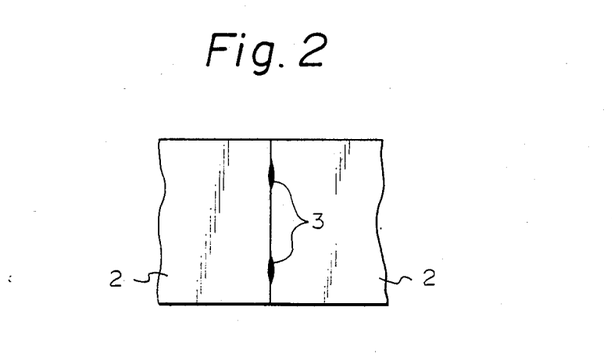
FIGS. 2 and 3 are schematic views illustrating the problems of conventional butt welding methods.

However, when performing butt welding on steel sheets in the above-described manner, there is a problem in that it is easy for the abutting surfaces of the sheets to be unevenly heated in the widthwise direction. Namely, the outer portions in the widthwise direction of the abutting surfaces tend to be inadequately heated, and those portions of the abutting surfaces which are located somewhat farther inwards in the widthwise direction tend to be overheated. In extreme cases, as shown in FIG. 2, those portions which are overheated melt through, or there may be inadequate upsetting of the abutting surfaces. In FIG. 2, reference numeral 3 indicates locations of poor upsetting between two steel sheets 2 due to overheating. On the other hand, if the amount of heating of the steel sheets 2 is reduced in order to avoid the above-described problems due to overheating, the outer portions of the abutting surfaces to be joined end up being underheated, cold welding defects take place, and the outer portions of the sheets are poorly joined to one another.

SUMMARY OF THE INVENTION

Accordingly, it is the object of the present invention to provide a butt welding method which can solve the above-described problems and join steel sheets together so that there is a good connection between the abutting surfaces to be joined over the entire width of the sheets.

The present inventors performed numerical analysis using the finite element method as well as experiments with the purpose of elucidating the reason for non-uniform heating of steel sheets during butt welding. As a result of these efforts, the cause of conventional problems in butt welding was found to be as follows.

Figure 3:
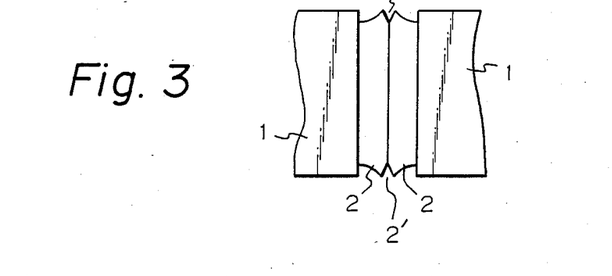

When steel sheets are joined by butt welding, only the vicinity of the abutting surfaces of the steel sheets is rapidly heated. Therefore, in the initial stage of welding, due to thermal expansion, the outer portions in the widthwise direction of the abutting surfaces of the steel sheets 2 undergo rotational deformation which causes discrete planar sections of the sheets located at each corner of the sheets forming part of the abutting surfaces to spread outwardly in the widthwise direction and away from each other in the longitudinal direction, as shown in FIG. 3. As a result, the widthwise outer portions on both sides of the sheets 2 are not in contact with one another.

Furthermore, in this state, if a large current continues to flow through the steel sheets, current concentrates in an extremely small area of the abutting surfaces adjoining the noncontacting outer portions, so a sudden concentration of heat takes place. At the same time, the widthwise outer portions of the abutting surfaces are inadequately heated.

For this reason, the steel sheets melt through in the region where the current concentrates, slightly inwards of the widthwise outer portions, adequate upsetting does not take place, and poor connections are formed. Furthermore, due to inadequate heating of the widthwise outer portions, these portions are not well connected to one another.

As already stated, if the current density is raised so as to prevent inadequate heating of the widthwise outer portions, the portions located just inwards thereof are overheated, melting through takes place, and upsetting is inadequate. If the current density is lowered in order to prevent these problems, the widthwise outer portions of the sheets are inadequately heated. This is because gaps 2' develop between the outer portions of the sheets 2, as shown in FIG. 3. After welding has progressed long enough for the sheets 2 to soften, the widthwise outer portions will eventually contact one another and current will flow therethrough. However, the total length of time for which current passes therethrough is inadequate, so the outer portions are inadequately heated.

Accordingly, in a broad sense, the present invention resides in a method of performing butt welding of the opposing surfaces of steel sheets, characterized by preventing the formation of gaps in the widthwise outer portions of the steel sheets during welding by suppressing rotational deformation of the abutting surfaces of the steel sheets in the widthwise outer portions thereof.

The formation of gaps in the widthwise outer portions of steel sheets can be prevented by various means.

In one embodiment of the present invention, gaps are prevented by varying the pressure which is applied to steel sheets across the width of the sheets. Namely, a greater pressure is applied during butt welding to the widthwise outer portions of the steel sheets than to the central portions of the steel sheets. The increased pressure which is applied to the widthwise outer portions prevents the formation of gaps between the outer portions. In a preferred embodiment, electrodes which apply pressure on and supply current to the steel sheets to be welded together are divided into at least three sections, i.e., two outer electrode sections which apply pressure to the widthwise outer portions of the steel sheets and at least one inner electrode section which applies pressure to the inner portions of the steel sheets. The pressure which is applied by the outer electrode sections is set to be larger than the pressure which is applied by the inner electrode sections.

In another embodiment of the present invention, the formation of gaps is prevented by varying the shape of the abutting surfaces of steel sheets along the width of the sheets. In a preferred embodiment, projections which confront one another are formed on the widthwise outer portions of the abutting surfaces of steel sheets.

In yet another embodiment of the present invention, the formation of gaps during butt welding is prevented by increasing the current density in the widthwise outer portions of steel sheets being welded with respect to the current density at the middle of the steel sheets. In a preferred embodiment, the current density is increased by using separate electrodes for the widthwise outer portions and for the inner portions of the steel sheets. The electrodes for the widthwise outer portions are controlled so as to produce a higher current density in the widthwise outer portions.

In still another embodiment of the present invention, the formation of gaps during butt welding is prevented by restraining the widthwise outer portions of steel sheets being welded by applying a widthwise pressure thereon.

In another embodiment of the present invention, the formation of gaps during butt welding is prevented by heating the widthwise outer portions of steel sheets being welded in the vicinity of the abutting surfaces.

In still another embodiment of the present invention, the formation of gaps during butt welding is prevented by decreasing the thickness of the widthwise outer portions of steel sheets with respect to the thickness of the outer portions of the sheets. By locally decreasing the thickness of the widthwise outer portions, the current density in the widthwise outer portions is increased and the widthwise outer portions can be adequately heated.

BRIEF DESCRIPTION OF THE DRAWINGS

FIG. 1b is a side view of FIG. 1a;

FIG. 7b is a graph showing the current density and electrode displacement as a function of time during the operation of the embodiment of FIG. 7a;

In the drawings, the same reference numerals indicate the same or corresponding parts.

DESCRIPTION OF THE PREFERRED EMBODIMENTS

Hereinbelow, a number of preferred embodiments of a butt welding method in accordance with the present invention will be described while referring to the accompanying drawings, FIGS. 4a and 4b of which illustrate butt welding by a first embodiment. In this embodiment, instead of employing a conventional one-piece electrode, each of a pair of steel sheets 2 is pressed against the other one by an electrode having at least three sections, and the pressure which is applied to the widthwise outer portions of the steel sheets is made higher than the pressure which is applied to the center portion thereof.

Figure 4A:
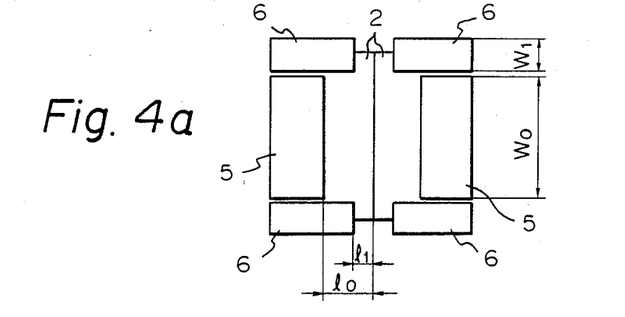
FIGS. 4a and 4b are schematic views of one embodiment of the present invention.
Figure 4B:
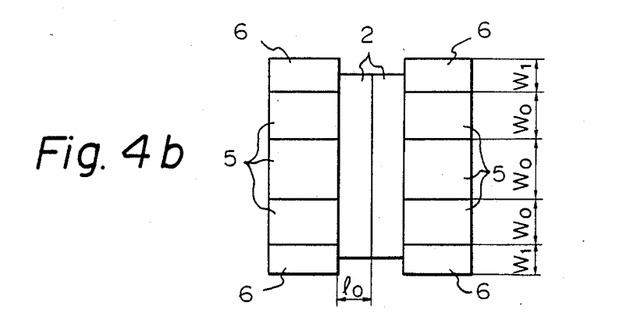

As shown in FIGS. 4a and 4b, two steel sheets 2 to be welded together are held between electrodes, each electrode having one or more inner electrode sections 5 which are flanked by two outer electrode sections 6. All of the electrode sections apply pressure and supply current to the steel sheets. The inner electrode sections 5 apply pressure to the inner portions of the steel sheets 2, while the outer electrode sections 6 apply pressure to the outer portions of the steel sheets 2. The pressure which is applied by the outer electrode sections 6 is made to be higher than the pressure which is applied by the inner electrode sections 5. There may be a single inner electrode section 5 for each electrode as shown in FIG. 4a, or a plurality of inner electrode sections 5 arranged in parallel, as shown in FIG. 4b.

By applying a higher pressure with the outer electrode sections 6 than with the inner electrode sections 5, the widthwise outer portions of the steel sheets 2 can be effectively prevented from undergoing rotational deformation during welding, and the formation of gaps between the outer portions of the abutting surfaces can be prevented.

If the width $W_1$ of the outer electrode sections 6 is decreased with respect to the width $W_o$ of the inner electrode sections 5 or if the ends of the outer electrode sections 6 are made to protrude towards one another past the ends of the inner electrode sections 5, as shown in FIG. 4a, the formation of gaps can be effectively prevented with only a small increase in pressure.

Figure 5:
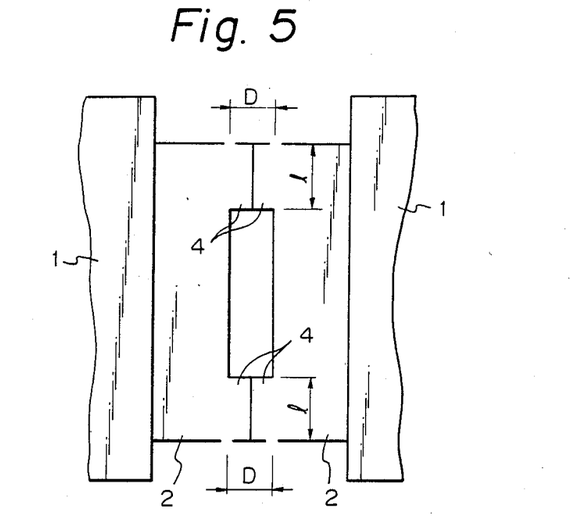
FIG. 5 is a schematic view of another embodiment of the present invention.

FIG. 5 illustrates another embodiment of the butt welding method of the present invention. In this embodiment, two steel sheets 2 to be welded together have projections 4 formed on the widthwise outer portions of their confronting surfaces. The steel sheets 2 are disposed between a pair of conventional one-piece electrodes 1 with the projections 4 abutting against one another. During the initial stage of welding, the current density in the projections 4 is higher than in the center portions of the steel sheets 2, so that inadequate heating of the widthwise outer portions of the sheets 2 can be prevented. Therefore, even though the current density can be set so that the portions of the steel sheets 2 which lie somewhat inwards of the projections 4 in the widthwise direction are not overheated, the current density in the projections 4 will be high enough to adequately heat the widthwise outer portions, and a good connection therebetween can be obtained.

As a result of various investigation and experiments, the present inventors found that the minimum size of gaps which develop between the widthwise outer portions of steel sheets during welding is 0.01 mm. Therefore, the total length D of the projections 4 (twice the length of each projection 4) should be at least 0.01 mm.

There is no absolute upper limit on the total length D, but in light of possible buckling of the projections 4 and the appearance of the weld bead (since the amount of upsetting of the projections 4 increases with their length, the amount of spreading of the weld bead is influenced), a maximum length of 0.5–1.0 mm is preferable.

The present inventors also found that the minimum width of the gaps which develop between the widthwise outer portions of thin steel plates during welding is 1 mm. Therefore, it is desirable that the width l of each projection 4 be at least 1 mm for the projections 4 to be effective.

On the other hand, if the width l of a projection 4 exceeds 50 mm, gaps develop between the projections 4 just as in a conventional butt welding process.

Therefore, the width l of each projection 4 is preferably from 1 to 50 mm.

Figure 6:
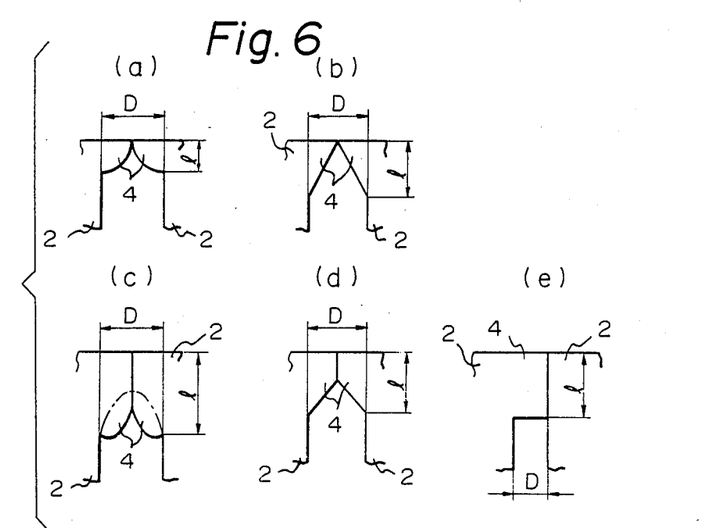
FIG. 6 shows plan views of examples of various shapes which can be employed for the projections 4 of the embodiment of FIG. 5.

There is no restriction whatsoever on the shape of the projections 4, and FIGS. 6a through 6d illustrate a few examples of shapes which can be employed. The dashed line in FIG. 6c shows another shape which may be employed in the present invention. As shown in FIG. 5, the projections 4 can be formed on both sheets 2 of a pair of steel sheets 2 to be welded together, but it is also possible to form projections 4 on only one sheet 2 of each pair, as shown in FIG. 6e.

Figure 7A:
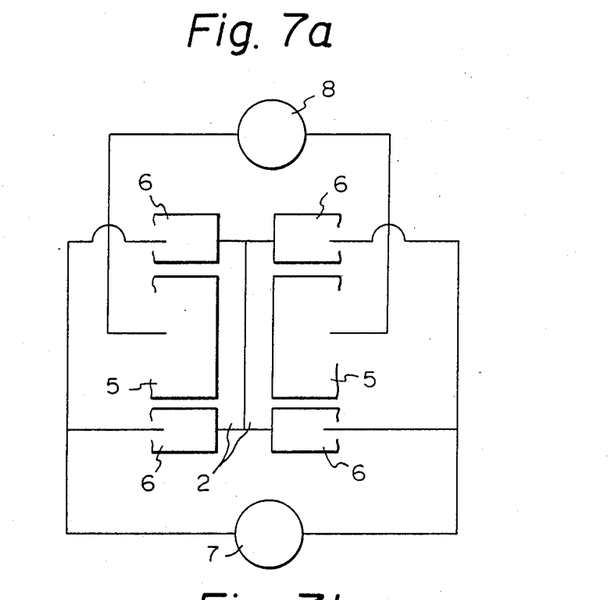
FIG. 7a is a schematic view of another embodiment of the present invention.

FIG. 7a illustrates another embodiment of the method of the present invention. In this embodiment, the current density through both of the widthwise outer portions of steel sheets 2 to be welded is initially set equal to the current density through the center of the steel sheets 2. Then, after a prescribed length of time, the current density in the widthwise outer portions is raised above the current density in the center. As a result, poor connections due to non-uniform heating can be prevented. As shown in FIG. 7a, two pairs of outer electrodes 6 are disposed so as to apply pressure to the widthwise outer portions of two steel sheets 2, and one pair of inner electrodes 5 is disposed between the outer electrodes 6. The outer electrodes 6 are connected to a first power supply 7, and the inner electrodes 5 are connected to a separate second power supply 8.

Figure 7B:
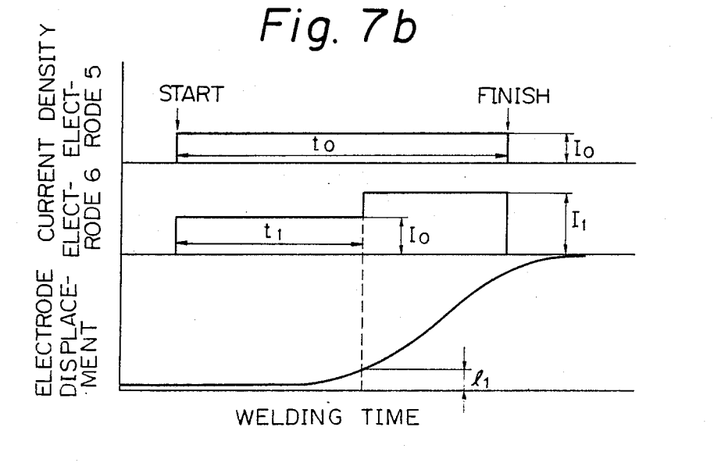

FIG. 7b illustrates the current densities for the inner and other electrodes as a function of time. At the start of welding, the two power supplies are controlled so that the initial current density through the inner electrodes 5 and the outer electrodes 6 has the same value (Io) for all the electrodes. This initial current density is set at a level so that overheating will not occur. After a length of time $t_p$, when the confronting outer portions come into contact, the current density for the outer electrodes 6 is increased to a higher value of $I_1$, while the current density through the inner electrodes 5 is maintained at Io. The time $t_1$ at which the current density for the outer electrodes 6 is increased can be controlled based on the length of time for which welding has been performed and on the displacement of the electrodes. The opposing electrodes move slightly towards each other as the welding proceeds.

This embodiment provides the effects that the current density can be controlled such that inadequate heating of the widthwise outer portions of steel sheets and overheating of those portions located somewhat inwards of the outer portions can be prevented, whereby good welds can be obtained.

Figure 8:
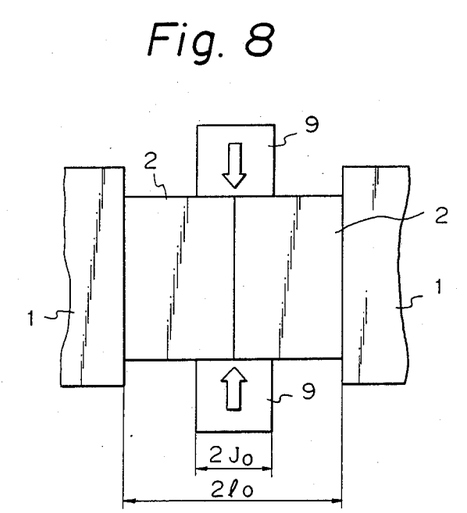
FIG. 8 is a schematic view of another embodiment of the present invention.

FIG. 8 illustrates another embodiment of the welding method of the present invention. In this embodiment, two steel sheets 2 are pressed towards one another by conventional one-piece electrodes 1. At the same time, the widthwise outer portions of the steel sheets 2 are restrained in the widthwise direction by a pair of restraining devices 9. The restraining devices 9 prevent the expansion of the widthwise outer portions of the sheets 2 and prevent the formation of gaps.

Figure 9A:
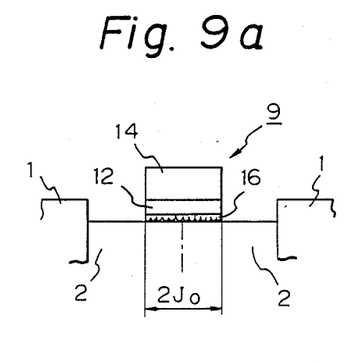
FIGS. 9a and 9b are schematic views of two different examples of the restraining device 9 of FIG. 8.
Figure 9B:
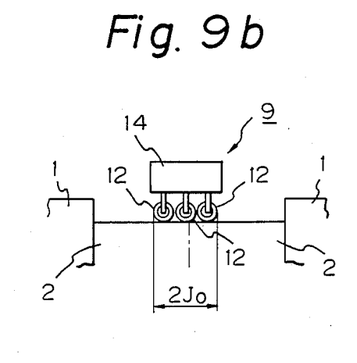

FIGS. 9a and 9b schematically illustrate two examples of the restraining device 9 of FIG. 8 for restraining steel sheets 2. The restraining devices 9 comprise a high-strength body 14 made of steel or the like and a contact portion 12 which contacts the edges of the steel sheets 2. In order not to disturb the main current flowing through the sheets 2, the contact portion 12 is made of a high-strength, heat-resistant electrical insulator such as a ceramic. In FIG. 9a, a lubricant 16 is applied to the surface of the contact portion 12 where it contacts the steel sheets 2. In FIG. 9b, instead of using a lubricant 16, the contact portion 12 is in the form of a plurality of rollers.

It is preferable that the restraining devices 9 be of the type that press the steel sheets 2 from the sides in the widthwise direction rather than the type which clamp the sides of the sheets. The former type of restraining device 9 makes it easier to perform butt welding on two steel sheets having different widths, and they also can prevent the accuracy of working and installation of the electrodes 1 from being affected by irregularities in the widths of the sheets.

When the arrangement of FIG. 8 is employed, if the initial restraining force is too large, the steel sheets 2 will buckle in the widthwise direction as welding progresses. On the other hand, if the restraining force is too small, thermal deformation of the steel sheets 2 in the widthwise direction can not be adequately prevented, with the result that poor connections are formed between the sheets. Accordingly, in order to achieve the objects of the present invention, it is necessary that the restraint conditions correspond to the properties of the steel sheets and the welding conditions. Furthermore, in order to form stable and complete connections, a relatively large amount of upsetting is necessary.

Gaps between the widthwise end portions of steel sheets during welding due to local thermal expansion are produced during the first third of the welding process. Therefore, if the formation of gaps during this initial stage can be prevented by a suitable method, non-uniform heating and poor connections can be prevented.

Figure 10:
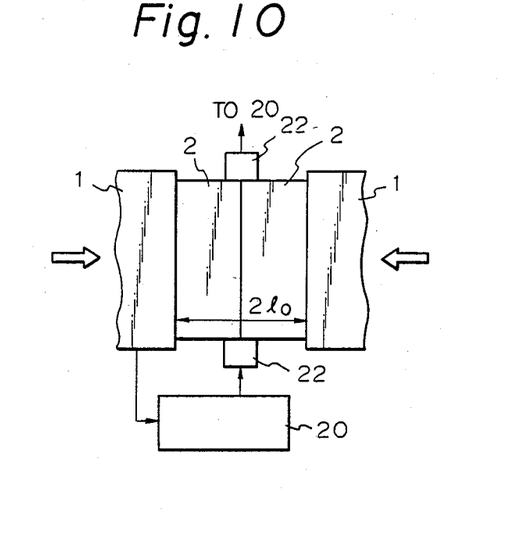
FIG. 10 is a schematic view of another embodiment of the present invention.
Figure 11:
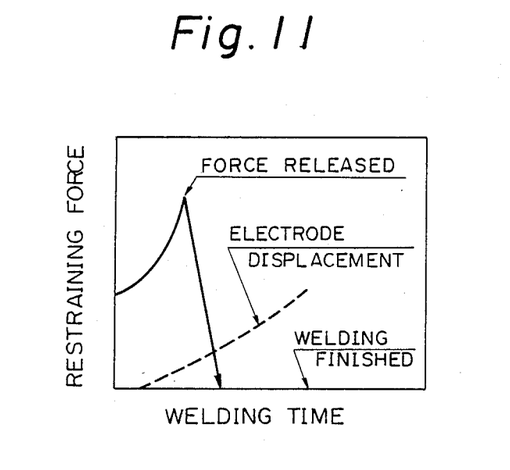
FIG. 11 is a graph of the relationship between restriction force and welding time for the embodiment of FIG. 10.

FIG. 10 illustrates another embodiment of the method of the present invention. In this embodiment, two steel sheets 2 are made to abut against one another by conventional one-piece electrodes 1. The outer edges of the steel sheets 2 in the widthwise direction are restrained by adjustable restraining mechanisms 22 which can exert a variable restraining force in the widthwise direction. The magnitude of the restraining force which is exerted by the adjustable restraining mechanisms is controlled by a restraining force controller 20. In the initial stage of welding, the adjustable restraining mechanisms 22 are controlled so as to prevent the formation of gaps at the ends of the steel sheets 2. Then, as welding progresses, the restraining force is lessened or even completely released so as to prevent the steel sheets 2 from buckling in the widthwise direction. Welding continues to be performed by the application of pressure and current even after the restraining force is released. FIG. 11 is a graph illustrating the relationship between the restraining force, the displacement of the electrodes 2, and welding time. The time at which the restraining force should be decreased or released can be determined based on the elapsed time from the start of welding, the load voltage, the displacement of the electrodes 1, or other parameter, but in order to perform stable control, it is most suitable that the time for releasing the restraining force be determined on the basis of electrode displacement.

Figure 12:
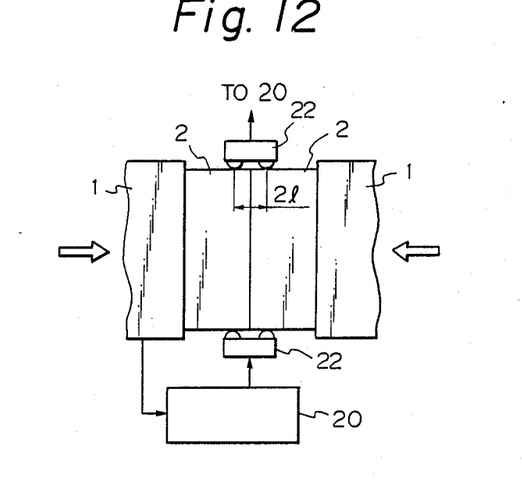
FIG. 12 is a schematic view of another embodiment of the present invention in which the outer portions of the steel sheets are not restrained in the portions adjoining the welded joint.

FIG. 12 illustrates a variation of the embodiment of FIG. 10 in which the adjustable restraining mechanisms 22 do not apply a restraining force to sides of the steel sheets 2 in the vicinity of the outer ends of the abutting surfaces. If the sides in the vicinity of the abutting surfaces are left unrestrained as shown in FIG. 12, a complete connection can be obtained with a relatively small amount of upsetting. This is because not restraining the end portions allows oxides which are formed during welding to escape from the joint, and refinement of the metal texture of the joint can be effectively carried out with a relatively small amount of upsetting.

As was mentioned earlier, if the abutting portions are completely restrained during welding, deformation of the abutting portions due to upsetting can be prevented. In order to obtain a crack proportion of 0% in a bead 180° bending test, it is necessary to impart a relatively large amount of upsetting.

On the other hand, if the amount of upsetting is too great, there is the danger of causing steel sheets to buckle. Accordingly, it is necessary to select the optimal amount of upsetting in accordance with the restraining conditions.

Figure 13:
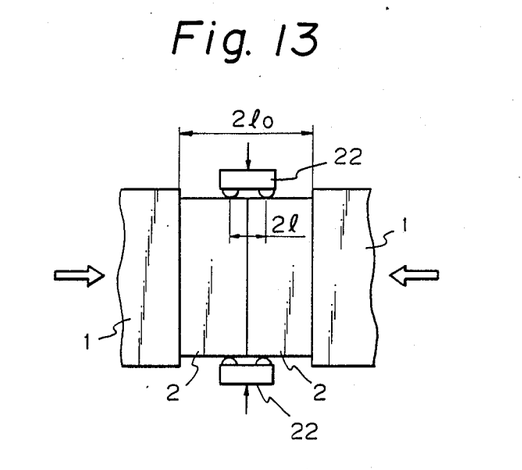
FIG. 13 is a schematic view of yet another embodiment of the present invention which differs from the embodiment of FIG. 12 in that the restraining force remains constant throughout welding.

FIG. 13 illustrates another embodiment of the method of the present invention which differs from the embodiment of FIG. 12 in that the restraining force which is exerted on the sides of steel sheets 2 being welded remains constant throughout the welding process.

Figure 14:
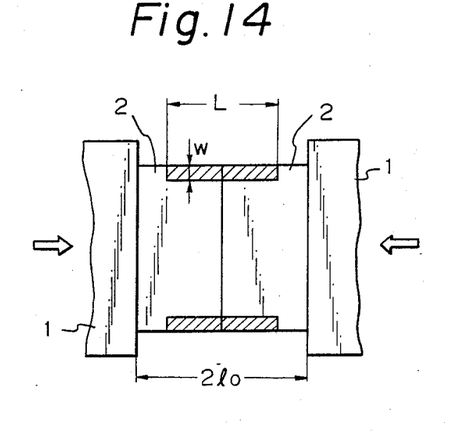
FIG. 14 is a schematic view of still another embodiment of the present invention in which the outer portions of steel sheets are heated during welding.

FIG. 14 illustrates another embodiment of the present invention in which poor connections due to non-uniform heating are prevented by heating both sides of steel sheets 2 in the vicinity of the welded joint while performing welding. As shown in FIG. 14, two steel sheets 2 are made to abut against one another by conventional one-piece electrodes 1. Two narrow regions (indicated by hatching) on opposite sides of the sheets 2 are heated while butt welding is performed, as a result of which rotational deformation of the widthwise outer portions of the sheets 2 and the formation of gaps between the sheets 2 are prevented. The heating makes the widthwise outer portions expand so that the formation of noncontacting portions is prevented. Each heated region has a length L and a width W.

Figure 15A:
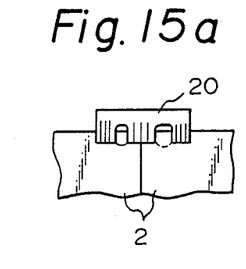
FIGS. 15a and 15b are respectively a side view and an end view of one example of a heating means for use with the embodiment of FIG. 14.
Figure 15B:
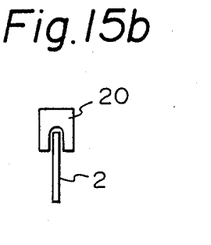
Figure 16A:
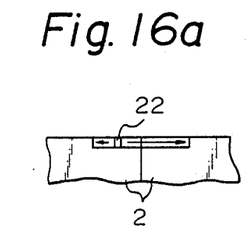
FIGS. 16a and 16b are respectively a side view and an end view of another example of a heating means.
Figure 16B:
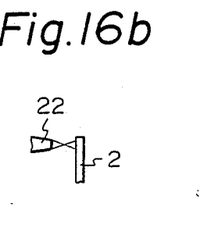

It is most effective to heat these two regions when rotational deformation of the widthwise ends of the sheets 2 is about to occur during welding. The heating temperature depends on the dimensions and particularly the length L of the heated regions. When it is important to prevent the softening of the heated regions on account of the use for which the steel sheets 2 are to be employed, the maximum heating temperature should be kept as low as possible. If the heating temperature is lowered, the length L of the heating region should be increased. Any suitable means can be used to heat the heated regions. For example, as shown in FIGS. 15a and 15b, which are respectively a side view and an end view of steel sheets 2 which are being joined, a high-frequency heating coil 20 can be used as a heating means. Alternatively, as shown in FIG. 16a and 16b, which are respectively a side view and an end view, a laser torch 22 can be used as a heating means. Other examples of heating means which can be used are a gas burner and a high-intensity light source such as a halogen lamp together with a condensing lens.

The effects of heating can be maximized if heating is rapidly performed during welding. However, it is also possible to effectively prevent poor connections by performing heating of the heated regions either prior or subsequent to welding.

Figure 17:
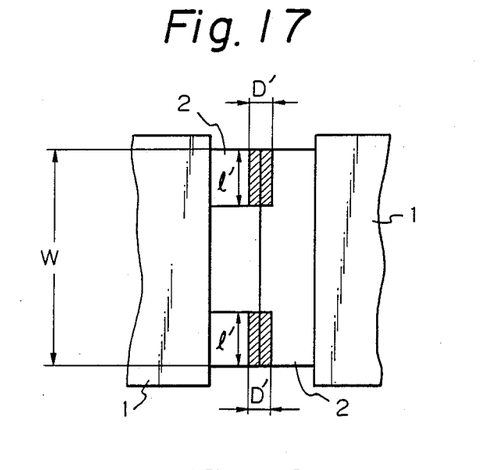
FIG. 17 is a schematic view of another embodiment of the present invention in which the outer portions of the steel sheets have a reduced thickness.

FIG. 17 is a schematic view of another embodiment of the method of the present invention in which the widthwise outer portions of the abutting surfaces of the steel sheets 2 are reduced in thickness compared to the other portions of the sheets. By reducing the thickness of the widthwise outer portions, the current density for these portions is increased relative to the other portions, with the result that inadequate heating of the widthwise outer portions can be prevented and good connections can be obtained. At the same time, the current density for the other portions of the sheets can be kept at a level at which the portions located slightly inwards of the portions having a decreased thickness are not overheated.

As a result of experiments, the present inventors found that if the total length D' of the portions having a reduced thickness is less than 0.5 mm, these portions are inadequately heated, so the total length D' is preferably at least 0.5 mm. There is no upper limit on the total length D', but if it is too large, a portion of reduced thickness will remain on the surface of the sheets after upsetting, so preferably the total length D' is less than the total displacement of the electrodes 1 during welding. In general, the total electrode displacement is at most 5 times the sheet thickness, so the length D' is preferably at most 5 times the sheet thickness.

As for the width l' of each of the portions of reduced thickness, the present inventors found by experiment that the minimum width of gaps which form between the widthwise outer portions of steel sheets during welding is 1 mm. Therefore, the width l' must be at least 1 mm for the portions of reduced thickness to be effective. It was also found that the maximum width of gaps is ¼ the width of the sheets, so the maximum value of the width l' is also preferably ¼ the width W of the sheets 2.

There is no restriction on the shape of the portions having a reduced thickness, and FIGS. 18(a)–(i) show end views of various examples of shapes which can be employed. The portions of reduced thickness can be formed by machining, rolling, or other suitable method. The portions of reduced thickness can be formed on both of the steel sheets 2 to be welded together as shown in FIG. 17, but it is also possible to form these portions on only one sheet 2 of each pair of sheets 2.

EXAMPLES

Next, the present invention will be described in further detail while referring to the following examples, which are presented merely for the purpose of illustration and do not limit the invention in any way.

Example 1

Using steel sheets having the composition, physical properties, and dimensions shown in Table 1, butt welding using the method illustrated in FIGS. 4a and 4b was performed under the welding conditions given in Table 2. The pressure applied by the inner electrodes was 8 kgf/mm². The properties of the resulting welded sheets are shown in Table 3.

Based on the results shown in Table 3, the following observations can be made.

(1) The crack proportion after a 180° bending test for a conventional example (No. 1) using one-piece electrodes was 10%.

(2) Increasing the width of the outer electrode sections (W1) reduces their effectiveness (Nos. 4 and 5).

(3) The effect of the outer electrode sections becomes striking when the pressure applied by the outer electrode sections is at least 1.5 times the pressure applied by the inner electrode (Nos. 2, 3, and 6–8).

(4) Dividing the electrodes into five sections provides the same effects as dividing them into three sections (No. 10).

(5) If the outer electrode sections protrude far past the inner electrode sections, the same pressure produces a greater effect (Nos. 6 and 9).

(6) From the above observations, it can be seen that as the pressure applied by the outer electrode sections is increased, as their width is decreased, or as the amount by which they protrude past the inner electrode sections is increased, the greater is the effect which they provide. However, as the pressure and amount of protrusion of the outer electrode sections is increased and as their width is decreased, the greater is the possibility of the electrodes' slipping and of the sheets' buckling. Therefore, the welding conditions must be chosen so that such problems do not occur.

Example 2

In this example, the method of the present invention which is illustrated in FIG. 5 was performed. The sheets being welded and the welding conditions were identical to those employed in Example 1. The pressure applied by the electrodes was 8 kgf/mm².

The test results are summarized in Table 4.

As is clear from Table 4, welded sheets obtained by the method of the present invention had a much lower crack proportion in a 180° bending test than welded sheets obtained by a conventional welding method.

Example 3

In this example, the method of the present invention which is illustrated in FIGS. 7a and 7b was carried out. The test materials and the welding conditions were identical to those used in Example 1.

The test results are summarized in Table 5.

As is clear from Table 5, the method of the present invention produces a much lower crack proportion than does the conventional method.

Example 4

In this example, the method of the present invention which is illustrated in FIGS. 8, 9a, and 9b was carried out. The test pieces and the welding conditions were identical to those used in Example 1. The pressure applied by the electrodes was 8 kgf/mm².

The test results are summarized in Table 6.

Based on the results shown in Table 6, the following observations can be made.

(1) The crack proportion in a bead after a 180° bending test for the conventional example (No. 1) which was not clamped or pressed was 10%.

(2) When the width which was pressed by the restraining device was set at ⅓ of the initial electrode separation, the crack proportion decreased as the restraining pressure increased (Nos. 2–5, and 10–13). However, above a certain point, increases in pressure produced no further improvement (Nos. 4, 5, and 13, 14).

(3) When the pressure applied by the restraining device is held constant and the pressing width is increased, the crack proportion decreases as the pressing width increases (Nos. 6–9, and 15–17). However, above a certain width, no further improvements are produced (Nos. 8, 9 and 16, 17).

(4) From the above observations, it can be seen that the pressing width ($2J_o$) of the device 9 is preferably at least ⅓ the electrode separation ($2l_o$), and if the restraining pressure is increased within the bounds in which buckling does not occur, the crack proportions is markedly decreased.

Example 5

In this example, the method of the present invention which is shown in FIGS. 10–12 was performed. The test materials and the welding conditions were identical to those used in Example 1. The pressure applied by the electrodes was 8 kgf/mm², the current density was 150 A/dm², and the initial electrode separation ($2l_o$) was 25 mm.

The test results are summarized in Table 7.

From the above test results, the following observations can be made.

(1) If the initial restraining force is too high, buckling of the sheets occurs in the widthwise direction (Nos. 1 and 8).

(2) Even if the initial restraining force is large, if the restraining force is released during welding, no buckling in the widthwise direction takes place, and a complete connection can be formed (Nos. 2–7).

However, if the time at which the restraining force is released is too late (if the electrode displacement is too large when the restraining force is released), widthwise buckling is produced (No. 10). On the other hand, if the restraining force is released too early (when the electrode displacement is too small), a complete connection can not be obtained (No. 9).

As a result of experimentation and research, it was found that the value of $\alpha$ (electrode displacement when restraining force is released/final amount of upsetting) should be roughly 0.1–0.5 in order to achieve the objects of the present invention.

(3) If the welded portion and its vicinity are left unrestrained from the start of welding, a complete connection can be obtained with a relatively small amount of upsetting (Nos. 6 and 7).

However, in this case, the initial restraining force is preferably larger than for case (2) described above.

Example 6

In this example, Example 5 was repeated with the exception that a restraining force controller was not employed. Namely, in this example, the restraining force remained constant throughout welding.

The test results are summarized in Table 8.

From the above results, it can be seen that if the outer sides are restrained with the exception of the portions adjoining the welded joint, a crack proportion of 0% can be achieved with a relatively low amount of upsetting (Nos. 3-8).

However, if the length 2l of the portion which is not restrained is less than 3 mm or at least 16 mm, a small amount of cracking takes place, although the amount of upsetting is small (Nos. 2, 9, and 10).

Example 7

In this example, the method of the present invention which is illustrated in FIGS. 14 and 15a was employed. The characteristics of a highfrequency electric heater which was employed are summarized in Table 9.

The test materials and welding conditions were the same as those in Example 1.

The test results are summarized in Table 10.

From the results shown in Table 10, the following observations can be made.

(1) The crack proportion for the conventional method was 10% (No. 1).
(2) A somewhat large heated width W produces a lower crack proportion (Nos. 2 and 3).
(3) The heated length L should be as long as possible (Nos. 3 and 9).
(4) A higher heating temperature is preferable (Nos. 3 and 5-7).
(5) Heating prior to welding is also effective; in this case, the higher the heating temperature, the better (Nos. 10 and 11). However, it is more effective to perform rapid heating during welding (Nos. 4 and 10, and 6 and 11).
(6) If the heated length L is increased, the heating temperature can be relatively low (Nos. 3 and 9).
(7) From the above observations, it can be seen that a striking effect is obtained by heating the widthwise ends. However, as already mentioned, it is most effective for the length L of the heated region to be as long as possible and for the heated width W to be somewhat large. Furthermore, although the heating temperature depends on the dimensions of the heated region, the higher the temperature, the greater is the effect.

However, it is necessary to limit the maximum heating temperature in accordance with the use of the thin steel sheets. Furthermore, heating prior to welding is also effective, but not as effective as performing rapid heating during welding.

Example 8

Figure 18:
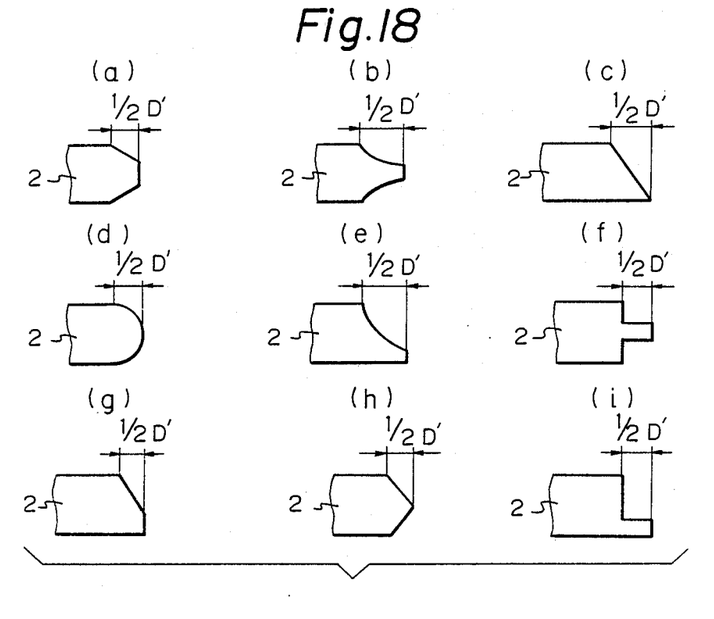
FIG. 18 shows end views of various examples of shapes which can be employed for the portions of reduced thickness in FIG. 17.

In this example, the method of the present invention which is illustrated in FIG. 17 was carried out. The test pieces and the welding conditions were identical to those employed in Example 1. The shape of the widthwise end portion of the steel sheet was that shown in FIG. 18a. The welding pressure was 8 kgf/mm$^2$.

The test results are summarized in Table 11.

As is clear from the results shown in Table 11, the crack proportion was far lower for the method of the present invention than for the conventional method.

Although the present invention has been described with reference to the forgoing preferred embodiments, it is to be understood that variations and modifications may be employed without departing from the concept of the present invention as defined in the following claims.

TABLE 1

| C | Si | Mn | P | S | Y.P. | T.S. | Sheet Thickness | Sheet Width |
|---|----|----|----|----|------|------|-----------------|-------------|
| 0.07 | 0.10 | 1.40 | 0.015 | 0.003 | 51 kgf/mm$^2$ | 63 kgf/mm$^2$ | 2.6 mm | 200 mm |

Units: Weight %

TABLE 2

| Current Density | Welding Time | Initial Electrode Separation (2 $l_0$) |
|---|---|---|
| 130 A/mm$^2$ | 0.8 sec | 15 mm |

TABLE 3

| | Electrode Width[1] | | Distance from Electrode Tip to Welded Joint | | Pressure (kgf/mm$^2$) | | Crack[2] Proportion | |
|---|---|---|---|---|---|---|---|---|
| No. | Outer $W_1$ | Inner $W_o$ | Outer $l_1$ | Inner $l_0$ | Outer | Inner | (%) | Comments |
| 1 | — | 200 | 7.5 | 7.5 | — | 8 | 10 | Conventional Method |
| 2 | 5 | 190 | 7.5 | 7.5 | 12 (8 × 1.5) | 8 | 0 | Present Invention (3-section electrode) |
| 3 | 10 | 180 | 7.5 | 7.5 | 12 (8 × 1.5) | 8 | 0 | Present Invention (3-section electrode) |
| 4 | 25 | 150 | 7.5 | 7.5 | 12 (8 × 1.5) | 8 | 0.5 | Present Invention (3-section electrode) |
| 5 | 50 | 100 | 7.5 | 7.5 | 12 (8 × 1.5) | 8 | 1.0 | Present Invention (3-section electrode) |
| 6 | 25 | 150 | 7.5 | 7.5 | 8.8 (8 × 1.1) | 8 | 0.8 | Present Invention (3-section electrode) |
| 7 | 25 | 150 | 7.5 | 7.5 | 16 (8 × 2.0) | 8 | 0 | Present Invention (3-section electrode) |
| 8 | 25 | 150 | 7.5 | 7.5 | 24 (8 × 3.0) | 8 | 0 | Present Invention (3-section electrode) |
| 9 | 25 | 150 | 2 | 7.5 | 8.8 (8 × 1.1) | 8 | 0 | Present Invention (3-section electrode) |
| 10 | 20,30 | 100 | 7.5 | 7.5 | 12 (8 × 1.5) | 8 | 0 | Present Invention (5-section electrode) |

Notes:
[1]$W_1$, $W_0$, $l_1$, $l_0$ are as shown in Figures 4a, and 4b
[2]Crack Proportion = (Total Length of cracks/width of sheets) × 100 (%)

TABLE 4

| No. | Length D of Projection (mm) | Width l of Projection (mm) | Crack Proportion (%) | Comments |
|---|---|---|---|---|
| 1 | — | — | 10 | Conventional Method |
| 2 | 0.008 | 10 | 5 | Present Method |
| 3 | 0.01 | 10 | 0 | Present Method |
| 4 | 0.05 | 10 | 0 | Present Method |
| 5 | 0.10 | 10 | 0 | Present Method |
| 6 | 1.0 | 10 | 0 | Present Method |

TABLE 4-continued

| No. | Length D of Projection (mm) | Width l of Projection (mm) | Crack Proportion (%) | Comments |
|---|---|---|---|---|
| 7 | 2.0 | 10 | 0 | Present Method |
| 8 | 0.05 | 0.8 | 5 | Present Method |
| 9 | 0.05 | 1.0 | 0 | Present Method |
| 10 | 0.05 | 2.0 | 0 | Present Method |
| 11 | 0.05 | 5.0 | 0 | Present Method |
| 12 | 0.5 | 0.8 | 5 | Present Method |
| 13 | 0.5 | 1.0 | 0 | Present Method |
| 14 | 0.5 | 2.0 | 0 | Present Method |
| 15 | 0.5 | 10.0 | 0 | Present Method |
| 16 | 0.5 | 48.0 | 0 | Present Method |
| 17 | 0.5 | 60.0 | 4 | Present Method |

TABLE 5

| | Current Density $I_0$ (A/mm²)[1] | Current Density $I_1$ (A/mm²)[2] | Time to Pressure (sec) | Pressure (kgf/mm²) | Delay Time $l_1$ (mm) | Delay Time $t_1$ (sec) | Crack Proportion (%) |
|---|---|---|---|---|---|---|---|
| | 190 | — | 0.8 | 8 | — | — | Overheating: 90 |
| Convent. Method | 150 | — | 0.8 | 8 | — | — | Overheating: 10 |
| | 130 | — | 0.8 | 8 | — | — | Underheating: 10 |
| | 100 | — | 0.8 | 8 | — | — | Underheating: 20 |
| | 130 | 150 | 0.8 | 8 | — | 10 | 0 |
| Present Method | 100 | 160 | 0.8 | 8 | — | 10 | 0 |
| | 130 | 150 | 0.8 | 8 | 0.1 | — | 0 |
| | 100 | 160 | 0.8 | 8 | 0.1 | — | 0 |

Notes:
[1] $I_0$ = (current in electrode 5)/(180 × 2.6)
[2] $I_1$ = (current in electrode 6)/(20 × 2.6)

TABLE 6

| No. | | Restraining Pressure (kgf/mm²) | Pressing Width (2 $J_0$) (mm) | Crack Proportion (%) |
|---|---|---|---|---|
| 1 | Convent. Method | — | — | 10.0 |
| | PRESENT METHOD | | | |
| 2 | FIG. 9a | 1 | 5 | 6.1 |
| 3 | " " | 2 | 5 | 1.2 |
| 4 | | 5 | 5 | 0 |
| 5 | | 6 | 5 | 0 |
| 6 | | 2 | 1 | 2.4 |
| 7 | | 2 | 2 | 1.6 |
| 8 | | 2 | 5 | 1.2 |
| 9 | | 2 | 10 | 1.2 |
| 10 | FIG. 9b | 1 | 5 | 6.3 |
| 11 | | 2 | 5 | 2.5 |
| 12 | | 5 | 5 | 0.8 |
| 13 | | 6 | 5 | 0 |
| 14 | | 7 | 5 | 0 |
| 15 | | 2 | 2 | 7.5 |
| 16 | | 2 | 5 | 2.4 |
| 17 | | 2 | 10 | 2.4 |

TABLE 7

| No. | Initial Restraining Force (kg) | Electrode Displacement (mm) | Not-Restrained Length 2 $l^1$ (mm) | Final Upsetting (mm) | Widthwise Buckling | Crack Proportion (%) | Remarks |
|---|---|---|---|---|---|---|---|
| 1 | 600 | — | — | 8.5 | yes | — | |
| 2 | 600 | 1 | — | 8.5 | none | 0 | |
| 3 | 600 | 2.5 | — | 8.5 | none | 0 | FIG. 10 |
| 4 | 600 | 4 | — | 8.5 | none | — | |
| 5 | 600 | 1 | — | 6.5 | none | 0.1 | |
| 6 | 800 | 2.5 | 8 | 6.5 | none | 0 | |
| 7 | 800 | 1 | 8 | 6.5 | none | 0 | FIG. 12 |
| 8 | 800 | — | 8 | 6.5 | yes | — | |
| 9 | 600 | 0.5 | — | 8.5 | none | 3 | FIG. 10 |
| 10 | 600 | 5 | — | 8.5 | yes | — | |

Note:
[1] 2 l is as shown in FIG. 12.

TABLE 8

| | No. | Initial Electrode Separation 2 $l_0$ (mm) | Not-Restrained Length 2 l (mm) | Upsetting (mm) | Crack Proportion (%) |
|---|---|---|---|---|---|
| Convent. Method | 1 | 20 | — | 8.5 | 12 |
| Present Invention | 2 | 20 | 2 | 6.5 | 0.05 |
| | 3 | 20 | 6 | 6.5 | 0 |
| | 4 | 20 | 10 | 6.5 | 0 |
| | 5 | 20 | 13 | 6.5 | 0 |
| | 6 | 30 | 3 | 6.5 | 0 |
| | 7 | 30 | 8 | 6.5 | 0 |
| | 8 | 30 | 12 | 6.5 | 0 |
| | 9 | 30 | 16 | 6.5 | 0.2 |
| | 10 | 30 | 18 | 6.5 | 0.3 |

TABLE 9

| No. of Coils | No. of Turns | Coil Dimensions (Length × Width) | Frequency of Power Supply | Capacity of Power Supply |
|---|---|---|---|---|
| 2 | 2 and 3 | 15 and 20 × 30 (mm) | 30 kHz | 50 kW |

TABLE 10

| No. | Heating Temperature (°C.) | Heating Length L(mm) | Heating Width W(mm) | Crack Proportion (%) | Remarks |
|---|---|---|---|---|---|
| 1 | — | — | — | 1.0 | Conventional Method |
| 2 | 300 | 15 | 2 | 0.5 | Present Invention[1] |
| 3 | 300 | 15 | 5 | 0 | Present Invention[1] |
| 4 | 300 | 15 | 10 | 0 | Present Invention[1] |
| 5 | 200 | 15 | 5 | 0.1 | Present Invention[1] |
| 6 | 500 | 15 | 5 | 0 | Present |

TABLE 10-continued

| No. | Heating Condition | | | Crack | Remarks |
| | Heating Temperature (°C.) | Heating Length L(mm) | Heating Width W(mm) | Proportion (%) | |
|---|---|---|---|---|---|
| 7 | 600 | 15 | 5 | 0 | Invention[1] Present Invention[1] |
| 8 | 200 | 7 | 5 | 1.5 | Present Invention[1] |
| 9 | 300 | 7 | 5 | 0.3 | Present Invention[1] |
| 10 | 300 | 15 | 5 | 0.7 | Present Invention[2] |
| 11 | 500 | 15 | 5 | 0.3 | Present Invention[2] |

Notes:
[1]Rapidly heated during welding
[2]Heated before welding

TABLE 11

| | D' (mm) | l' (mm) | Electrode Displacement (mm) | Crack Proportion (%) | Remarks |
|---|---|---|---|---|---|
| Conventional Method | — | — | 8 | 10 | |
| Comparative | 0.3 | 10 | 8 | 9.0 | |
| | 5.0 | 0.05 | 8 | 8.8 | |
| | 0.5 | 10 | 8 | 1.0 | |
| | 1.0 | 10 | 8 | 0.8 | |
| | 5.0 | 10 | 8 | 0 | |
| Present Invention | 7.0 | 10 | 8 | 0 | |
| | 10.0 | 10 | 8 | 0 | Thickness Reduced on the surface |
| | 5.0 | 1.0 | 8 | 0.8 | |
| | 5.0 | 2.0 | 8 | 0 | |
| | 5.0 | 5.0 | 8 | 0 | |
| | 5.0 | 20.0 | 8 | 0 | |
| | 5.0 | 50.0 | 8 | 0 | |

We claim:

1. A butt welding method comprising abutting a pair of steel sheets and welding the abutting surfaces by opposing electrodes while preventing gaps from developing between the widthwise outer portions of said steel sheets by suppressing rotational deformation of the abutting surfaces in the widthwise outer portions thereof.

2. A butt welding method as claimed in claim 1, wherein on each side of said sheets in the widthwise direction, at least one of said sheets has a projection formed in its widthwise outer portion, said projections extending towards the widthwise outer portion of the other sheet, whereby at the initial stage of welding, only said widthwise outer portions contact one another.

3. A butt welding method as claimed in claim 2, wherein the total length of the projections on each side of said sheets in the widthwise direction is at least 0.01 mm and the width of each projection is 1–50 mm.

4. A butt welding method as claimed in claim 1, wherein the sides of said sheets in the vicinity of the abutting surfaces are restrained or pressed in the widthwise direction while welding is performed.

5. A butt welding method as claimed in claim 4, wherein the length of the region which is restrained or pressed is at least ⅓ the initial separation between said electrodes.

6. A butt welding method as claimed in claim 4, wherein the portions which are restrained during welding do not include the portions immediately adjoining the abutting surfaces.

7. A butt welding method as claimed in claim 4, wherein said sides of said sheets comprise longitudinally extending side edges of said sheets which are substantially perpendicular to said widthwise direction.

8. A butt welding method as claimed in claim 1, wherein the sides of said sheets are heated during welding.

9. A butt welding method as claimed in claim 8, wherein said heating is performed by high-frequency electric heating.

10. A butt welding method as claimed in claim 8, wherein said heating is performed using a laser.

11. A butt welding method as claimed in claim 8, wherein said heating is localized to sections of said sheets extending a first distance longitudinally along said sides of said sheets and extending a second distance inwardly from said sides of said sheets, the temperature of said heating applied to said sections being less than the melting temperature of the sheets.

12. A butt welding method as claimed in claim 1, wherein the thickness of a region of the widthwise outer portions of said sheets is less than the thickness of the other portions of said sheets located adjacent to the abutting surfaces and extending between the widthwise outer portions, the total length of the regions of reduced thickness on each side of said sheets being at least 0.5 mm and the width of each of said regions of reduced thickness being 1 mm to ¼ the width of said sheets.

13. A butt welding method as claimed in claim 12, wherein said sheets extend in a longitudinal direction and said abutting surfaces extend in a widthwise direction which is perpendicular to said longitudinal direction, said length of said regions of reduced thickness extending in said longitudinal direction and said width of said regions of reduced thickness extending in said widthwise direction.

14. A butt welding method as claimed in claim 1, wherein said sheets extend in a longitudinal direction and said abutting surfaces extend in a widthwise direction perpendicularly to said longitudinal direction, said widthwise outer portions being prevented from rotating in a plane containing said widthwise and longitudinal directions.

15. A butt welding method as claimed in claim 1, wherein said widthwise outer portions comprise discrete planar sections of the sheets located at each corner of the sheets forming part of the abutting surfaces, said sheets being welded along the entire width thereof during said welding step.

16. A butt welding method comprising abutting a pair of steel sheets and welding the abutting surfaces by opposing electrodes while preventing gaps from developing between the widthwise outer portions of said steel sheets by suppressing rotational deformation of the abutting surfaces in the widthwise outer portions thereof, said sheets being made to abut against one another by a pair of electrodes which are each divided in the widthwise direction into two outer electrode sections which apply pressure to the widthwise outer portions of one of said sheets and at least one inner electrode section which is disposed between said outer electrode sections and applies pressure to the middle portion of one of said sheets, the pressure which is applied by said outer electrode sections being higher than the pressure which is applied by said inner electrode section.

17. A butt welding method as claimed in claim 16, wherein each of said electrodes comprises two outer electrode sections and a single inner electrode section.

18. A butt welding method as claimed in claim 17, wherein the pressure applied to said sheets by said outer electrode sections is at least 1.5 times the pressure applied to said sheets by said inner electrode sections.

19. A butt welding method comprising abutting a pair of steel sheets and welding the abutting surfaces by opposing electrodes while preventing gaps from developing between the widthwise outer portions of said steel sheets by suppressing rotational deformation of the abutting surfaces in the widthwise outer portions thereof, wherein during welding, the current density through the middle portions of said sheets is the same as the current density through the widthwise outer portions of said sheets, and after a prescribed length of time, the current density through said outer portions is raised above the current density through said middle portion.

20. A butt welding method comprising abutting a pair of steel sheets and welding the abutting surfaces by opposing electrodes while preventing gaps from developing between the widthwise outer portions of said steel sheets by suppressing rotational deformation of the abutting surfaces in the widthwise outer portions thereof, the sides of said sheets in the vicinity of the abutting surfaces being restrained or pressed in the widthwise direction while welding is performed, said restraining force being released as welding progresses and welding continues to be performed by the application of pressure and current after said restraining force is released.

* * * * *